United States Patent
Lei (10) Patent No.: US 11,509,427 B2
(45) Date of Patent: Nov. 22, 2022

(54) UPLINK CONTROL INFORMATION RETRANSMISSION

(71) Applicant: LENOVO (BEIJING) LIMITED, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 210 days.

(21) Appl. No.: 16/961,954

(22) PCT Filed: Jan. 19, 2018

(86) PCT No.: PCT/CN2018/073416
§ 371 (c)(1),
(2) Date: Jul. 14, 2020

(87) PCT Pub. No.: WO2019/140635
PCT Pub. Date: Jul. 25, 2019

(65) Prior Publication Data
US 2020/0389258 A1    Dec. 10, 2020

(51) Int. Cl.
*H04L 1/18* (2006.01)
*H04L 1/08* (2006.01)
*H04W 72/12* (2009.01)

(52) U.S. Cl.
CPC .......... *H04L 1/1816* (2013.01); *H04L 1/08* (2013.01); *H04L 1/1854* (2013.01); *H04L 1/1887* (2013.01); *H04W 72/1289* (2013.01)

(58) Field of Classification Search
CPC ....... H04L 1/1816; H04L 1/08; H04L 1/1854; H04L 1/1887; H04L 1/1685; H04L 1/1864; H04L 1/1896; H04W 72/1289
See application file for complete search history.

(56) References Cited

U.S. PATENT DOCUMENTS 9,197,389 B2 * 11/2015 Jang ............... H04L 1/0042
2016/0353430 A1   12/2016 Chen
(Continued)

FOREIGN PATENT DOCUMENTS

EP    2490632 A1    8/2012
WO   2017050078 A1  3/2017

OTHER PUBLICATIONS

PCT/CN2018/073416, "International Search Report and the Written Opinion of the International Search Authority" ISA/CN, State Intellectual Property Office of the P.R. China, dated Sep. 28, 2018, pp. 1-6.

*Primary Examiner* — Min Jung
(74) *Attorney, Agent, or Firm* — Kunzler Bean & Adamson (57) ABSTRACT

Methods and apparatuses for retransmitting uplink control information. An apparatus comprising: a receiver that receives uplink control information (UCI) from a remote unit, wherein the UCI includes hybrid automatic repeat request acknowledgement (HARQ-ACK) feedback corresponding to a plurality of downlink transmissions; a processor that decodes the UCI; and a transmitter that, in response to the UCI not being correctly decoded, transmits downlink control information (DCI) including a first signaling to the remote unit, wherein the first signaling includes an indicator indicating that the UCI is not correctly decoded and an identification corresponding to the UCI.

21 Claims, 5 Drawing Sheets

(56) References Cited

U.S. PATENT DOCUMENTS

| | | | |
|---|---|---|---|
| 2019/0207719 A1* | 7/2019 | Shevchenko | H04L 1/0061 |
| 2019/0207734 A1* | 7/2019 | Yang | H04L 1/1819 |
| 2020/0044780 A1* | 2/2020 | Lei | H04L 1/1893 |
| 2020/0236700 A1* | 7/2020 | Matsumura | H04L 5/0007 |
| 2020/0245319 A1* | 7/2020 | Chen | H04L 5/0007 |
| 2020/0366420 A1* | 11/2020 | Gou | H04L 1/1854 |
| 2021/0119737 A1* | 4/2021 | Sagfors | H04L 1/1887 |

* cited by examiner

Figure 7

UPLINK CONTROL INFORMATION RETRANSMISSION

FIELD

The subject matter disclosed herein generally relates to wireless communications, and more particularly relates to the retransmission of uplink control information.

BACKGROUND

The following abbreviations are herewith defined, some of which are referred to within the following description: Third Generation Partnership Project (3GPP), Cyclic Redundancy Check (CRC), Downlink (DL), Evolved Node B (eNB), European Telecommunications Standards Institute (ETSI), Enhanced Interference Management and Traffic Adaptation (eIMTA), Frequency Division Duplex (FDD), Frequency Division Multiple Access (FDMA), Hybrid Automatic Repeat Request Acknowledgement (HARQ-ACK), Long Term Evolution (LTE), Multiple Access (MA), Next Generation Node B (gNB), New Radio (NR), Negative Acknowledgement (NACK), Orthogonal Frequency Division Multiplexing (OFDM), Physical Resource Block (PRB), Physical Downlink Shared Channel (PDSCH), Physical Uplink Control Channel (PUCCH), Physical Uplink Shared Channel (PUSCH), Positive Acknowledgement (ACK), Radio Resource Control (RRC), Reference Signal (RS), Single Carrier Frequency Division Multiple Access (SC-FDMA), System Information (SI), Signal to Interference plus Noise Ratio (SINR), Transport Block (TB), Time-Division Duplex (TDD), Time Division Multiplex (TDM), User Entity/Equipment (Mobile Terminal) (UE), Uplink (UL), Uplink Control Information (UCI), Universal Mobile Telecommunications System (UMTS), Ultra Reliable & Low Latency Communication (URLLC) and Worldwide Interoperability for Microwave Access (WiMAX).

In 3GPP 5G new radio (NR), the downlink (DL) transport blocks (TBs) are carried on the Physical Downlink Shared Channel (PDSCH) from a gNB to a UE. HARQ-ACK (hybrid automatic repeat request acknowledgement) represents collectively the Positive Acknowledgement (ACK) and the Negative Acknowledgement (NACK). ACK means that a TB is correctly received at the UE while NACK means a TB is erroneously received at the UE. The HARQ-ACK feedback bits corresponding to the PDSCH are transmitted as Uplink Control Information (UCI) either on the Physical Uplink Control Channel (PUCCH) or on the Physical Uplink Shared Channel (PUSCH) from the UE to the gNB.

In NR, the HARQ-ACK codebook ranges from one single bit for one PDSCH to hundreds of bits for multiple PDSCHs.

The large signaling overhead on UCI may lead to low transmission reliability, requiring further optimization of the UCI reliability when a large UCI payload is carried on one-symbol PUCCH. If the UCI is not successfully decoded at gNB side, i.e., the CRC check for the Polar encoded UCI payload is failed, the gNB has to retransmit all previously transmitted PDSCHs, resulting in severely degraded performance of the DL.

Factors which have a negative impact on UCI transmission reliability include the following:

UE's UL transmission power: for a large UCI payload on a short PUCCH, the straightforward solution is to occupy more frequency resources to lower the UCI coding rate. This results in lower PSD issues considering UE is power limited. Lower PSD may cause a lower SINR on the receiving side.

Burst interference from neighbouring cell: A neighbouring cell may support UL URLLC transmission, which is a burst transmission and may have high transmission power for high reliability. A URLLC transmission from a neighbouring cell may lead to severe interference to an adjacent cell's UCI transmission.

Cross-link interference: Due to dynamic TDD in each cell, DL-to-UL interference may be severe based on the learning from Rel-12 TDD eIMTA. UCI transmission in one cell may suffer interference from a neighbouring cell's DL transmission.

Therefore, UCI transmission in NR should be optimized to further enhance transmission reliability.

BRIEF SUMMARY

Apparatuses and methods for retransmitting uplink control information are disclosed.

In one embodiment, an apparatus comprising: a receiver that receives uplink control information (UCI) from a remote unit, wherein the UCI includes hybrid automatic repeat request acknowledgement (HARQ-ACK) feedback corresponding to a plurality of downlink transmissions; a processor that decodes the UCI; and a transmitter that, in response to the UCI not being correctly decoded, transmits a first signaling to the remote unit, wherein the first signaling includes an indicator indicating that the UCI is not correctly decoded.

In one embodiment, the first signaling schedules a retransmission of the UCI. The initial transmission and one or more subsequent retransmissions of UCI form a UCI process. Preferably, each of the plurality of downlink transmissions has a UCI process identification (ID) for differentiating different UCI processes. A maximum number of supported UCI processes is configured by RRC signaling and determines a number of bits for indicating the UCI process ID in downlink control information (DCI). The first signaling preferably includes the UCI process ID In another embodiment, the transmitter further transmits a radio resource control (RRC) signaling to the remote unit, wherein the RRC signaling is used to configure the remote unit in a mode of supporting UCI retransmission. The RRC signaling may further configure a timer. The timer may start in a slot where the UCI is received. The first signaling is transmitted before the timer expires. The timer may be reset after the first signaling is transmitted.

In some embodiment, the transmitter, in response to the UCI being correctly decoded, transmits a second signaling to the remote unit indicating that the UCI is correctly decoded.

In another embodiment, a method comprising: receiving uplink control information (UCI) from a remote unit, wherein the UCI includes hybrid automatic repeat request acknowledgement (HARQ-ACK) feedback corresponding to a plurality of downlink transmissions; decoding the UCI; and transmitting a first signaling to the remote unit in response to the UCI not being correctly decoded, wherein the first signaling includes an indicator indicating that the UCI is not correctly decoded.

In one embodiment, an apparatus comprising: a transmitter that transmits uplink control information (UCI) to a base unit, wherein the UCI includes hybrid automatic repeat request acknowledgement (HARQ-ACK) feedback corresponding to a plurality of downlink transmissions; and a receiver that receives a first signaling from the base unit, wherein the transmitter retransmits the UCI to the base unit in the condition that the first signaling includes an indicator indicating that the UCI is not correctly decoded.

In some embodiments, the apparatus further comprises a memory that stores the UCI until the base unit indicates that the UCI is correctly decoded, or stores the UCI until the timer expires.

In yet another embodiment, a method comprising: transmitting uplink control information (UCI) to a base unit, wherein the UCI includes hybrid automatic repeat request acknowledgement (HARQ-ACK) feedback corresponding to a plurality of downlink transmissions; receiving a first signaling from the base unit; and retransmitting the UCI to the base unit in the condition that the first signaling includes an indicator indicating that the UCI is not correctly decoded.

BRIEF DESCRIPTION OF THE DRAWINGS

A more detailed description of the embodiments briefly described above will be specified and illustrated in the appended drawings. With the caveat that these drawings depict only some embodiments, and should not therefore limit their scope, the embodiments will be described and explained with additional specificity and detail through the use of the accompanying drawings, in which.

DETAILED DESCRIPTION

As those familiar in the field will be aware, aspects of the embodiments may be embodied as a system, apparatus, method, or program product. Accordingly, embodiments may be comprised entirely of hardware, entirely of software (including firmware, resident software, micro-code, etc.) or a hybrid that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or similar.

Modules may also be implemented in code and/or software for execution by various types of processors. An identified module of code may, for instance, include one or more physical or logical blocks of executable code which may be organized as an object, procedure, or function. Nevertheless, the executables of an identified module need not be physically located together, but may include disparate instructions stored in different locations which, when joined logically together, include the module and achieve the stated purpose for the module.

A module of code may be a single or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or "Flash Memory"), portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or similar, and conventional procedural programming languages, such as the "C" programming language or similar, and/or machine languages such as assembly languages. The code may be executed entirely or partly on the user's computer, as a stand-alone software package, partly on the user's computer and partly on a remote computer or entirely on the remote computer or server. In the very last scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. Experts will recognize, however, that embodiments may be practiced without one or more of the specific details, or with other methods, components, materials, and so forth. In other instances, well-known structures, materials, or operations are not shown or described in detail to avoid obscuring any aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
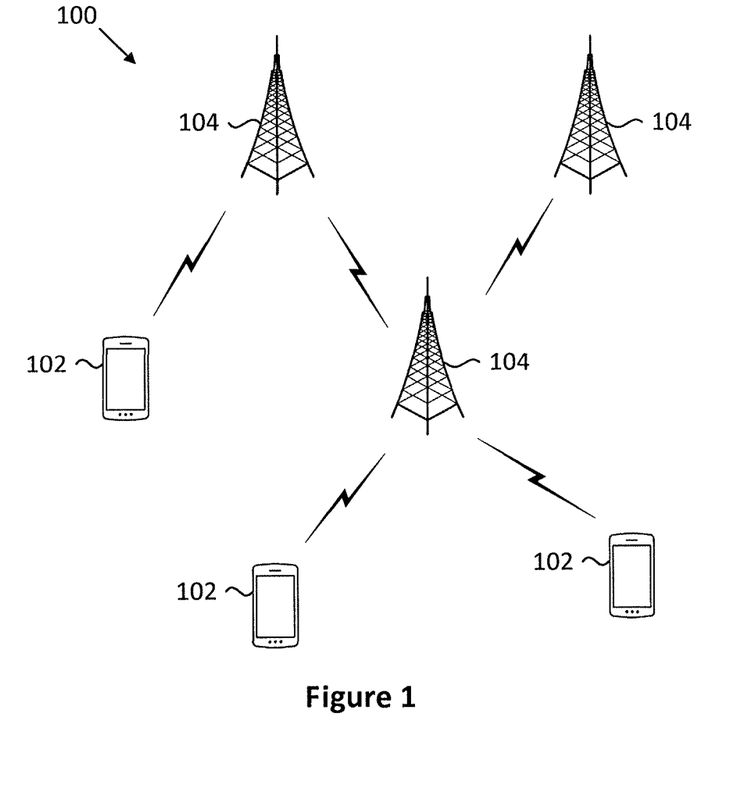
FIG. 1 is a schematic block diagram illustrating one embodiment of a wireless communication system for retransmitting uplink control information.

FIG. 1 depicts an embodiment of a wireless communication system 100 for retransmitting uplink control information. In one embodiment, the wireless communication system 100 includes remote units 102 and base units 104. Even though a specific number of remote units 102 and base units 104 are depicted in FIG. 1, it should be noted that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G new radio (NR). More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

Figure 2:
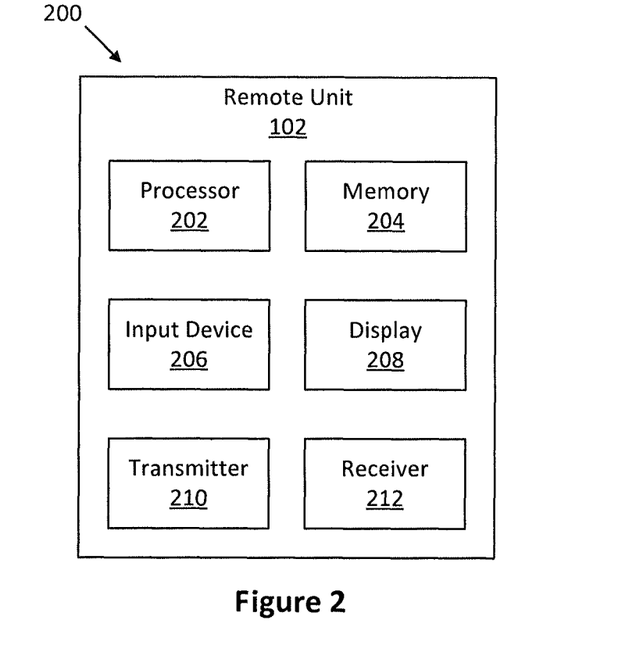
FIG. 2 is a schematic block diagram illustrating one embodiment of an apparatus that may be used for retransmitting uplink control information.

FIG. 2 depicts one embodiment of an apparatus 200 that may be used for retransmitting uplink control information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
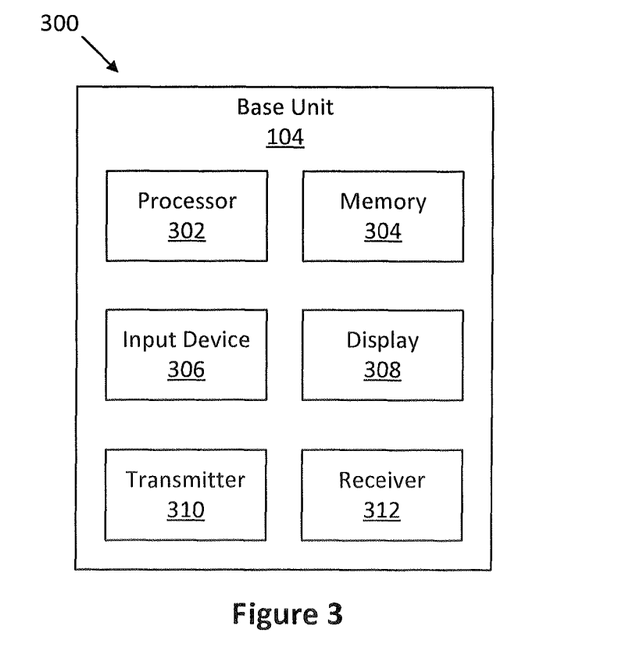
FIG. 3 is a schematic block diagram illustrating one embodiment of an apparatus that may be used for retransmitting uplink control information.

FIG. 3 depicts one embodiment of an apparatus 300 that may be used for retransmitting uplink control information. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
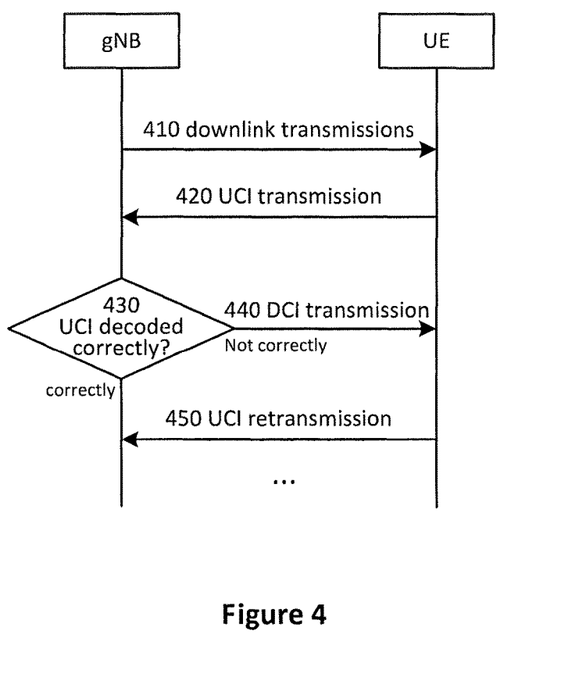
FIG. 4 is a schematic diagram illustrating one embodiment of retransmitting uplink control information.

FIG. 4 depicts a method (400) for retransmitting uplink control information (UCI). In step 410, the gNB transmits downlink data (downlink transmissions) with transport blocks (TBs) on PDSCH. Multiple PDSCHs are configured in one downlink association set due to their corresponding HARQ-ACK feedback is transmitted in one UCI. In particular, one or two TBs may be transmitted in one PDSCH. In particular, in a single-codeword transmission, one TB is transmitted in one PDSCH, while in a two-codeword transmission, two TBs are transmitted in one PDSCH. Multiple PDSCHs may be transmitted in the time domain and/or in multiple component carriers. For example, if the downlink association set is configured with N slots and the number of configured carriers is C, and suppose that one TB is transmitted in one PDSCH, then N*C TBs would be transmitted in one downlink association set.

For each transmitted TB, the UE would transmit a HARQ-ACK on PUCCH or PDSCH back to the gNB to indicate whether or not the transmitted TB is successfully received at the TB. The HARQ-ACK may be Positive Acknowledgement (ACK), which means that the TB is correctly received at the UE, or Negative Acknowledgement (NACK), which means the TB is erroneously (i.e. not correctly) received at the UE. Therefore, for each TB, one bit may be used as the HARQ-ACK. Multiple HARQ-ACKs may be combined as a HARQ-ACK codebook to be transmitted together as a HARQ-ACK feedback. For example, in the condition that N*C TBs are transmitted in one downlink association set, a HARQ-ACK codebook (or HARQ-ACK feedback) with N*C bits for the downlink association set may be transmitted back to the gNB, in which each bit represents whether the corresponding each of the N*C TBs is successfully or erroneously received at the UE.

In addition, multiple code block groups (CBGs) may be configured in one TB. Therefore, instead of transmitting a HARQ-ACK to indicate a correctly or erroneously received TB, a HARQ-ACK may be used to indicate whether a CBG is correctly or erroneously received at the UE. For example, if M is the number of CBGs configured in one TB, the HARQ-ACK codebook will include N*C*M bits. Typically, N may be assumed to 4, C may be configured to the maximum value of 16 and M may be configured to 8. In this assumption, the HARQ-ACK codebook size is equal to 4*16*8=512 for single-codeword transmission. Incidentally, in the condition of two-codeword transmission, the HARQ-ACK codebook size will be doubled.

As described above, the UE, upon receiving the multiple TBs (or CBGs) in a downlink association set (DAS), transmits a HARQ-ACK codebook (HARQ-ACK feedback) to the gNB to indicate whether the multiple TBs (or CBGs) are correctly or erroneously received at the UE. The transmission of the HARQ-ACK feedback is included in an uplink control information (UCI) transmission (420). The UCI transmission is made according to HARQ-ACK timing indication and PUCCH resource indication in DL assignment.

Upon receiving the UCI, the gNB checks (430) whether the UCI can be correctly decoded. In particular, the CRC of the UCI may be checked. If the UCI can be correctly decoded, i.e. the CRC check is passed, the gNB will further check each bit of the HARQ-ACK codebook, which is either ACK or NACK. For each of the NACKs contained in the HARQ-ACK codebook, the gNB will retransmit the corresponding TB (or CBG) indicated by the NACK. If the UCI cannot he correctly decoded, i.e. the CRC check is failed, the gNB sends (440) a signaling to the UE to indicate that the UCI cannot be correctly decoded. The signaling may include downlink control information (DCI) for scheduling a retransmission of the UCI.

Traditionally, if the UCI cannot be correctly decoded, the gNB will have to retransmit all of the TBs (or CBGs) in the downlink association set corresponding to the HARQ-ACK feedback. This is not desirable.

In the embodiment, if the UCI cannot be correctly decoded, the gNB initiates a UCI retransmission by transmitting a DCI so that the UCI including the HARQ-ACK feedback can be retransmitted from the UE to the gNB. The failed CRC check of the UCI only indicates that the UCI is erroneously received at the gNB, but does not necessarily indicate that all of the TBs (or CBGs) in the downlink association set corresponding to the HARQ-ACK feedback are erroneously received at the UE. As mentioned in the background part, there are various reasons that may interfere with the transmission of UCI, which might cause that the UCI is erroneously received at the gNB. Therefore, it is extremely inefficient to retransmit all of the TBs (or CBGs) in the downlink association set only because the UCI cannot be decoded at the gNB.

The DCI transmission may additionally include the resource necessary for the UE to retransmit the UCI, so that the UCI retransmission may be scheduled. Upon receiving the DCI, the UE retransmits (450) the UCI including the HARQ-ACK feedback to the gNB.

Upon receiving the retransmitted UCI, the gNB may check whether the retransmitted UCI can be correctly decoded. Optionally, the gNB may combine the retransmitted UCI with previous transmitted UCI for further decoding. In this condition, it is highly possible that the retransmitted UCI (or the combined UCI) may be correctly decoded.

Figure 5:
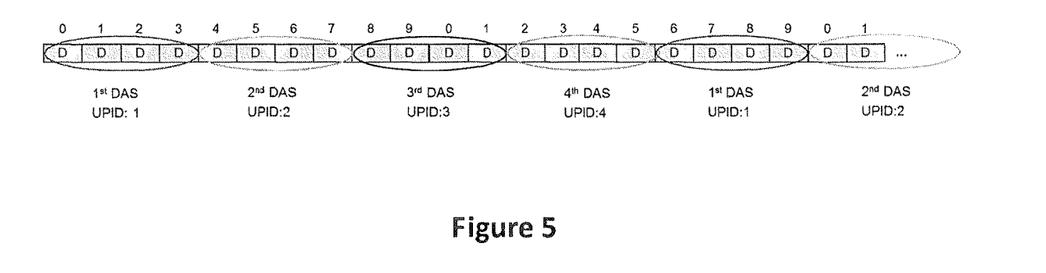
FIG. 5 is a schematic diagram illustrating one embodiment of UPID.

FIG. 5 shows the example of UCI process ID (UPID). As described above, one HARQ-ACK codebook corresponds to one downlink association set (DAS). In the condition that the gNB sends the signaling to the UE to instruct the UE to retransmit the UCI, the gNB has to inform the UE which HARQ-ACK codebook should be retransmitted. This is accomplished by introducing a UCI process ID (UPID). Each downlink association set (DAS) is assigned with a UPID. The DCI sent from the gNB to the UE for retransmitting the UCI contains a UPID to indicate which HARQ-ACK codebook should be retransmitted. In the example of FIG. 5, four UCI processes are configured, which means that two bits are contained in the DCI for indicating the corresponding UCI retransmission. The multiple PDSCHs within the same downlink association set have the same UPID.

As shown in FIG. 5, four consecutive slots are bundled in one DAS. In FIG. 5, each slot may have UL part for UCI transmission. In the condition that four UCI processes are is configured, each UCI should finish its initial transmission and retransmission(s) during the transmission of the following three downlink association sets.

Figure 6:
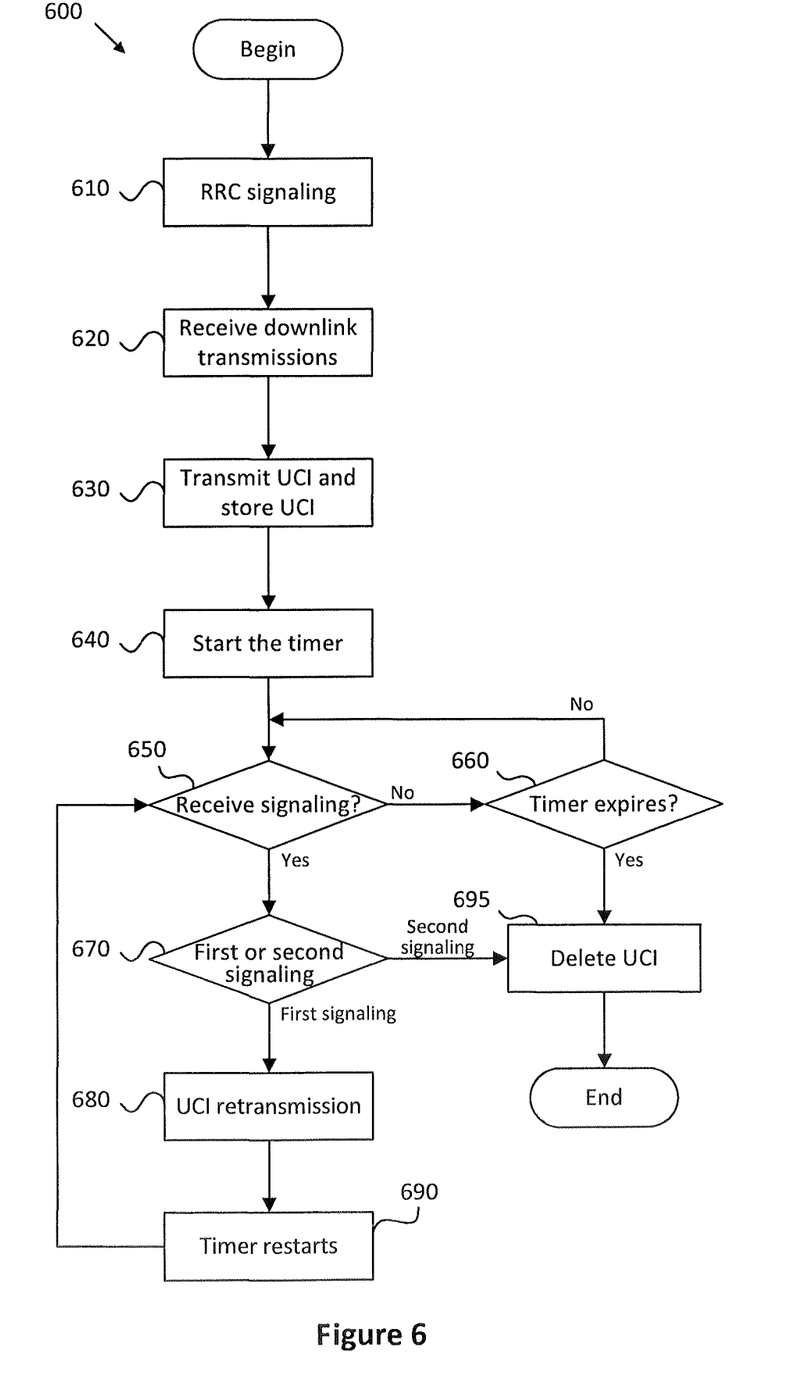
FIG. 6 is a schematic flow chart diagram illustrating an embodiment of a method for retransmitting uplink control information.

FIG. 6 illustrates an embodiment of a method for retransmitting uplink control information from a UE point of view.

The method 600 begins with a step 610 of RRC signaling. In the RRC signaling, the UE is configured to support the retransmission of uplink control information. This may be accomplished by RRC information ENABLE or DISABLE to configure the UE to a mode of supporting or not supporting UCI retransmission. In the mode of supporting of UCI retransmission, the UE should store the UCI in its memory for a period of time. In the condition that the UE is configured to support the UCI retransmission, a maximum number of supported UCI processes is also configured. The maximum number of the supported UCI processes may be indicated by its number, for example, four in the situation shown in FIG. 5. The maximum number of the supported UCI processes determines how many numbers of bits should be contained in DCI for indicating different UCI processes, for example, 2 bits are needed in the situation shown in FIG. 5.

Preferably, a timer is also configured in the RRC signaling. The timer is used to determine the time limit for retransmitting the UCI.

In step 620, the UE receives one or multiple PDSCHs in a downlink association set (DAS). The DAS may contain multiple slots or non-slots (namely, mini-slots). Each PDSCH has one or two TBs (or multiple CBGs). Preferably, all of PDSCHs transmitted in one DAS have the same UPID. A HARQ-ACK codebook is generated for the DAS, wherein each HARQ-ACK (ACK or NACK) represents whether the corresponding one of the TBs (or CBGs) transmitted in the DAS is correctly or erroneously received at the UE.

In step 630, the UE transmits uplink control information (UCI) including the HARQ-ACK feedback to the gNB.

If the UE is configured to support UCI retransmission, it is required to store the UCI in its memory so that the stored UCI may be used for retransmission. In step 630, the UE also stores the UCI in its memory. The storing UCI may be performed before, after and/or at the same time as the transmission of UCI.

After the UE transmits the UCI including the HARQ-ACK feedback, the timer starts in step 640. The timer preferably starts in a slot where the UCI is transmitted.

The process moves to step 650, in which the UE checks whether it receives a signal from the gNB. If no signal is received, in step 660, the UEs checks whether the timer started in the step 640 has expired. If the timer has not expired, the process returns to step 650. If the timer has expired, the UE assumes that the gNB has correctly decoded the UCI, and therefore deletes the UCI from its memory (step 695).

In the step 650, if a signaling including downlink control information (DCI) is received, the UE judges whether a first signaling or a second signaling is received in step 670. The first signaling includes an indicator indicating that the UCI is not correctly decoded at the gNB, which means a retransmission of the UCI is scheduled. As shown in FIG. 5, multiple DASs are transmitted to the UE, in which each DAS has a UPID. Therefore, the DCI transmitted from the gNB includes the UPID to indicate which UCI (i.e. which HARQ-ACK codebook) shall be retransmitted. In the condition of FIG. 5 in which four UPIDs are configured, the transmission and the retransmission of the UCI with the UPID 1 shall be finished before the end of the transmission of the 4th DAS. This is because after the transmission of the 4th DAS, another 1st DAS with the UPID 1 will be transmitted.

In the condition that the first signaling is judged at step 670, the UE retransmits, in step 680, the UCI including the HARQ-ACK feedback with the UPID indicated in the DCI.

After the retransmission of the UCI at the step 680, the timer will restart at step 690. The timer preferably restarts in a slot where the UCI is retransmitted. Then, the process goes back to the step 650.

The second signaling means that the UCI has been correctly decoded at the gNB. In the condition that the second signaling is judged at step 670, the UE knows that the UCI is correctly decoded at the gNB. Therefore, the process moves to the step 695, in which the UCI, which does not need to be retransmitted, is deleted.

Figure 7:
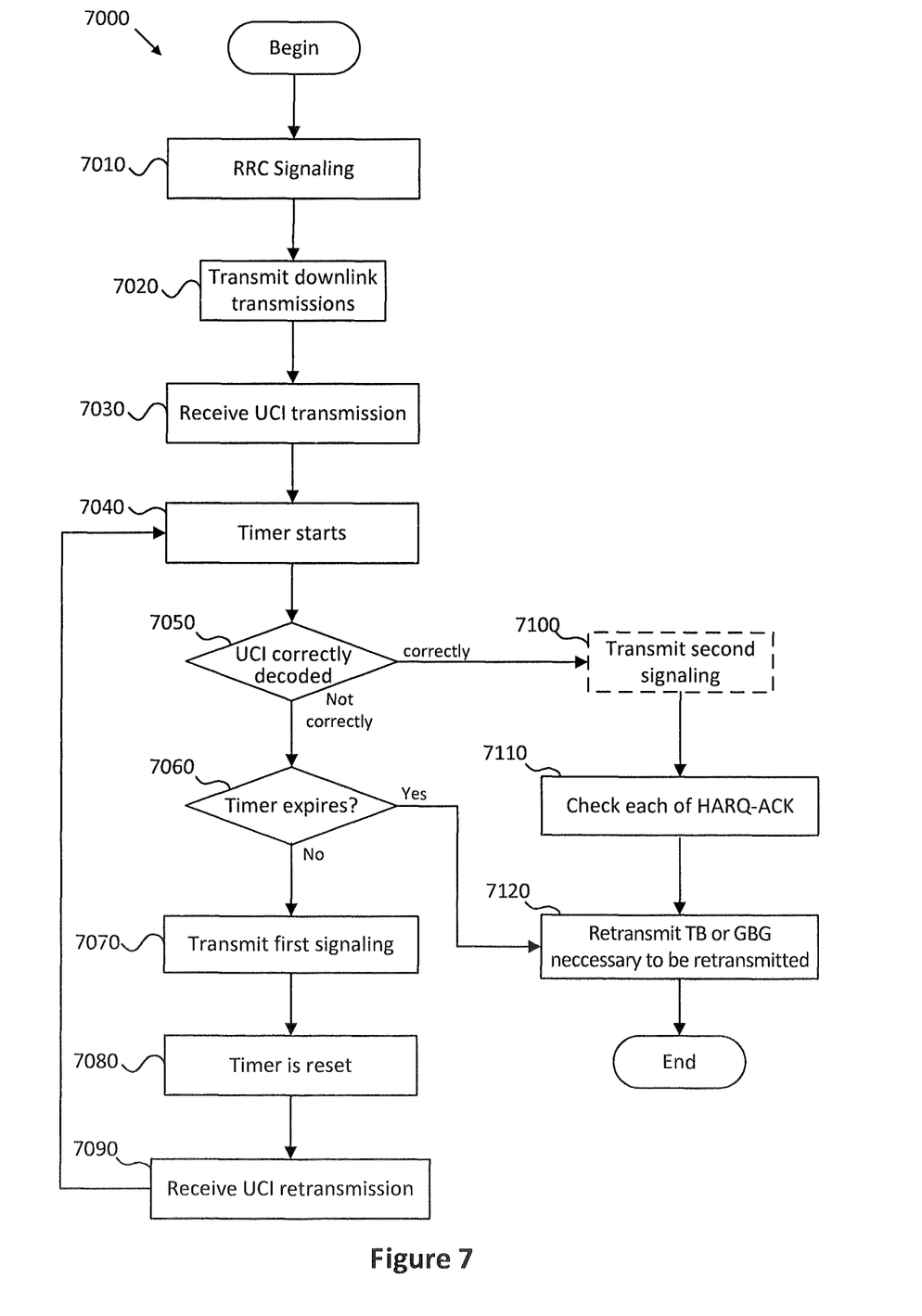
FIG. 7 is a schematic flow chart diagram illustrating an embodiment of another method for retransmitting uplink control information.

FIG. 7 illustrates an embodiment of another method 7000 for retransmitting uplink control information from a gNB point of view.

In step 7010, the gNB configures the UE with a RRC signaling. In the RRC signaling, the UE is configured to support the retransmission of uplink control information. This may be accomplished by a RRC information ENABLE or DISABLE to configure the UE to a mode of supporting or not supporting UCI retransmission. In the condition that the UE is configured to support the UCI retransmission, a maximum number of supported UCI processes is also configured. Preferably, a timer is also configured in the RRC signaling. The timer is used to determine the time limit for retransmitting the UCI.

The valid period of the timer is predetermined at the gNB. For example, the gNB may decide the valid period of the timer by referring to the maximum number of supported UCI processes and/or the configuration of UCI retransmission. In some embodiments, the UCI retransmission may be performed at least twice in the condition that the previously received UCI(s) cannot be correctly decoded.

In step 7020, the gNB transmits one or multiple PDSCHs in a downlink association set (DAS) to the UE. The DAS may contain one or multiple slots or non-slots (namely, mini-slots). Each PDSCH has one or two TBs (or multiple CBGs). Preferably, all PDSCHs transmitted in one DAS have the same UPID.

In step 7030, the gNB receives UCI transmitted from the UE. The UCI includes the HARQ-ACK codebook in which each HARQ-ACK (ACK or NACK) represents whether the corresponding TBs (or CBGs) transmitted in the DAS is correctly or erroneously received at the UE In step 7040, the timer starts. The timer preferably starts in a slot where the UCI is received.

In step 7050, the gNB checks whether the received UCI can be correctly decoded. In particular, the gNB checks the CRC of the UCI. If the UCI cannot be correctly decoded, i.e. the CRC check is failed, the gNB checks in step 7060 whether the timer has expired.

In the condition that the timer has not expired in step 7060, the gNB transmits a first signaling to the UE in step 7070. The first signaling indicates that the UCI cannot be correctly decoded. The first signaling may include downlink control information (DCI) for scheduling a retransmission of the UCI. The DCI preferably contains a UPID to indicate which HARQ-ACK codebook should be retransmitted.

After the transmission of the first signaling, the timer is reset at step 7080.

In step 7090, the gNB receives the UCI retransmission which includes the retransmitted HARQ-ACK codebook.

Then, the process goes back to the step 7040, i.e., starts the timer. As the step 7040 has been performed, in the condition that the method goes from the step 7090 to the step 7040, the step 7040 may be referred to as "timer restarts".

In the step 7050, in the condition that the gNB determines that the UCI or the retransmitted UCI can be correctly decoded, the process goes to step 7100.

In step 7100, the gNB transmits a second signaling to the UE to indicate that the UCI is correctly decoded at the gNB.

Step 7100 is optional. With reference to FIG. 6, in the condition that the second signaling is received at step 670, the UE knows that the UCI is correctly decoded at the gNB. This situation corresponds to step 7100 being performed. If step 7100 is not performed, the UE will not receive any signaling from the gNB (step 650, No). In the condition that the timer has expired in step 660, the UE will assume that the UCI is correctly decoded at the gNB.

Turning attention back to FIG. 7, in step 7110, in the condition that the UCI (or the retransmitted UCI) can be correctly decoded, no matter whether step 7100 is performed, the gNB checks each HARQ-ACK contained in the HARQ-ACK codebook, which can be either ACK or NACK.

As NACK means that a corresponding TB (or CBG) is not correctly received at the UE, the gNB, in step 7120, retransmits each of the TBs (or CBGs) corresponding to NACKs contained in the HARQ-ACK codebook.

In the step 7060, in the condition that the timer has expired, the method also goes to the step 7120. The valid period of the timer may be predetermined by referring to the maximum number of supported UCI processes and/or the configuration of the UCI retransmission. Take FIG. 5 as an example, maximum 4 UCI processes are configured, which implies each UCI should finish its initial transmission and retransmission during the transmission of the following three downlink association sets. After the duration, the timer in the step 7060 has to expire.

In the condition that the timer expires in step 7060, the UCI and/or the retransmitted UCI still cannot be correctly decoded, which means that the gNB does not know whether the TBs (or CBGs) transmitted in the DAS are correctly or erroneously received at the UE. In this condition, the gNB has to retransmit all TBs (or CBGs) in the DAS with assumption of all NACKs. In other words, all TBs (or CBGs) in the DAS must be retransmitted.

As described above, in the condition that the gNB receives the UCI retransmission at the step 7090, the gNB checks whether the retransmitted UCI can be correctly decoded at the step 7050. This may be performed in a different manner. An optional step may be performed immediately after the step 7090. In the optional step, the gNB may combine the retransmitted HARQ-ACK with previous transmitted HARQ-ACK, before checking whether the combined HARQ-ACK can be correctly decoded.

Said optional step may additionally or alternatively be performed after a negative determination of the step 7060. The gNB may first attempt to check whether the retransmitted UCI can be correctly decoded. If not, after the negative determination of step 7060, i.e. the timer has not expired, the gNB may perform the optional step of combining the retransmitted HARQ-ACK with previous transmitted HARQ-ACK before checking whether the combined HARQ-ACK can be correctly decoded.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that receives uplink control information from a remote unit, wherein the uplink control information includes hybrid automatic repeat request acknowledgement feedback corresponding to a plurality of downlink transmissions;
a processor that decodes the uplink control information; and
a transmitter that, in response to the uplink control information not being correctly decoded, transmits downlink control information comprising a first signaling to the remote unit, wherein the first signaling includes an indicator indicating that the uplink control information has not been correctly decoded and an identification corresponding to the uplink control information.

2. The apparatus of claim 1, wherein the first signaling schedules a retransmission of the uplink control information.

3. The apparatus of claim 2, wherein initial transmission and one or more subsequent retransmissions of uplink control information form an uplink control information process.

4. The apparatus of claim 3, wherein each of the plurality of downlink transmissions has an uplink control information process identification for differentiating different uplink control information processes.

5. The apparatus of claim 4, wherein a maximum number of supported uplink control information processes is configured by radio resource control signaling and determines a number of bits for indicating the uplink control information process identification in downlink control information.

6. The apparatus of claim 1, wherein the transmitter further transmits a radio resource control signaling to the remote unit, wherein the radio resource control signaling is used to configure the remote unit in a mode of supporting uplink control information retransmission.

7. The apparatus of claim 6, wherein the radio resource control signaling further configures a timer, and the timer starts or restarts in a slot where the uplink control information is transmitted or retransmitted.

8. The apparatus of claim 7, wherein the timer is reset after the first signaling is transmitted.

9. The apparatus of claim 1, wherein the transmitter, in response to the uplink control information being correctly decoded, transmits a second signaling to the remote unit indicating that the uplink control information is correctly decoded.

10. A method comprising:
receiving uplink control information from a remote unit, wherein the uplink control information includes hybrid automatic repeat request acknowledgement feedback corresponding to a plurality of downlink transmissions;
decoding the uplink control information; and
transmitting downlink control information comprising a first signaling to the remote unit in response to the uplink control information not being correctly decoded, wherein the first signaling includes an indicator indicating that the uplink control information is not correctly decoded and an identification corresponding to the uplink control information.

11. An apparatus comprising:
a transmitter that transmits uplink control information to a base unit, wherein the uplink control information includes hybrid automatic repeat request acknowledgement feedback corresponding to a plurality of downlink transmissions; and
a receiver that receives downlink control information comprising a first signaling from the base unit, wherein the transmitter retransmits the uplink control information to the base unit in the condition that the first signaling includes an indicator indicating that the uplink control information is not correctly decoded and an identification corresponding to the uplink control information.

12. The apparatus of claim 11, wherein the first signaling also includes a resource for the retransmission of the uplink control information.

13. The apparatus of claim 11, wherein initial transmission and one or more subsequent retransmissions of uplink control information form an uplink control information process.

14. The apparatus of claim 13, wherein each of the plurality of downlink transmissions has an uplink control information process identification for differentiating different uplink control information processes.

15. The apparatus of claim 14, wherein a maximum number of supported uplink control information processes is configured by radio resource control signaling and determines a number of bits for indicating the uplink control information process identification in downlink control information.

16. The apparatus of claim 11, wherein the receivers further receives a radio resource control signaling from the base unit, wherein the radio resource control signaling is used to configure the apparatus in a mode of supporting uplink control information retransmission.

17. The apparatus of claim 16, wherein the radio resource control signaling further configures a timer, and the timer starts or restarts in a slot where the uplink control information is transmitted or retransmitted.

18. The apparatus of claim 17, further comprising a memory that stores the uplink control information until the timer expires.

19. The apparatus of claim 11, wherein the receiver receives a second signaling from the base unit indicating that the uplink control information is correctly decoded.

20. The apparatus of claim 19, further comprising a memory that stores the uplink control information until the base unit indicates that the uplink control information is correctly decoded.

21. A method comprising:
- transmitting uplink control information to a base unit, wherein the uplink control information includes hybrid automatic repeat request acknowledgement feedback corresponding to a plurality of downlink transmissions;
- receiving downlink control information comprising a first signaling from the base unit; and
- retransmitting the uplink control information to the base unit in the condition that the first signaling includes an indicator indicating that the uplink control information is not correctly decoded and an identification corresponding to the uplink control information.

* * * * *